US009720287B2

(12) United States Patent
Yoshida

(10) Patent No.: US 9,720,287 B2
(45) Date of Patent: Aug. 1, 2017

(54) LIQUID CRYSTAL DISPLAY DEVICE

(71) Applicant: Sharp Kabushiki Kaisha, Osaka-shi, Osaka (JP)

(72) Inventor: Kazuko Yoshida, Osaka (JP)

(73) Assignee: Sharp Kabushiki Kaisha, Sakai (JP)

(*) Notice: Subject to any disclaimer, the term of this patent is extended or adjusted under 35 U.S.C. 154(b) by 0 days.

(21) Appl. No.: 14/917,956

(22) PCT Filed: Aug. 22, 2014

(86) PCT No.: PCT/JP2014/071957
§ 371 (c)(1),
(2) Date: Mar. 10, 2016

(87) PCT Pub. No.: WO2015/045694
PCT Pub. Date: Apr. 2, 2015

(65) Prior Publication Data
US 2016/0216542 A1  Jul. 28, 2016

(30) Foreign Application Priority Data

Sep. 24, 2013  (JP) ................. 2013-197280

(51) Int. Cl.
G02F 1/1339  (2006.01)
G02F 1/1333  (2006.01)
(Continued)

(52) U.S. Cl.
CPC .......... *G02F 1/1339* (2013.01); *G02F 1/1337* (2013.01); *G02F 1/13394* (2013.01);
(Continued)

(58) Field of Classification Search
CPC ............. G02F 1/1339; G02F 1/133528; G02F 1/1337; G02F 1/13394; G02F 1/133377; G02F 2001/133388
See application file for complete search history.

(56) References Cited

U.S. PATENT DOCUMENTS

2006/0262253 A1   11/2006  Teramoto et al.
2011/0001714 A1*   1/2011  Sasaki ................ G02F 1/13338
                                                           345/173
2016/0299381 A1*  10/2016  Lu ..................... G02F 1/133555

FOREIGN PATENT DOCUMENTS

JP        09-265087 A    10/1997
JP     2002-116534 A     4/2002
(Continued)

OTHER PUBLICATIONS

Machine translation of JP 2009-139603.*
Official Communication issued in International Patent Application No. PCT/JP2014/071957, mailed on Nov. 11, 2014.

Primary Examiner — Joseph L Williams
Assistant Examiner — Jose M Diaz
(74) Attorney, Agent, or Firm — Keating & Bennett, LLP

(57) ABSTRACT

The present invention aims to provide a liquid crystal display device capable of suppressing display defects in the image display portion, improving the display quality in the image display portion and the transmissive portion, improving the visibility in the transmissive portion, and improving the long-term reliability. The present invention provides a liquid crystal display device provided with a liquid crystal display panel, the liquid crystal display panel including: a transmissive portion (6B) that allows a region behind the liquid crystal display panel to be visible; an image display portion (6A) that includes pixels and is configured to display images; a first liquid crystal layer (5A) provided correspondingly to the image display portion (6A); a second liquid crystal layer (5B) provided correspondingly to the transmissive portion (6B); and a seal (52) surrounding the second liquid crystal layer (5B), the first liquid crystal layer (5A) and the second liquid crystal layer (5B) being separated by the seal (52).

12 Claims, 9 Drawing Sheets

(51) Int. Cl.
*G02F 1/1335* (2006.01)
*G02F 1/1337* (2006.01)

(52) U.S. Cl.
CPC .. *G02F 1/133377* (2013.01); *G02F 1/133528* (2013.01); *G02F 2001/133388* (2013.01)

(56) References Cited

FOREIGN PATENT DOCUMENTS

| | | |
|---|---|---|
| JP | 2004-105616 A | 4/2004 |
| JP | 2005-052195 A | 3/2005 |
| JP | 2005-052196 A | 3/2005 |
| JP | 2005-052198 A | 3/2005 |
| JP | 2006-343728 A | 12/2006 |
| JP | 2007-127940 A | 5/2007 |
| JP | 2009-139603 A | 6/2009 |

* cited by examiner

LIQUID CRYSTAL DISPLAY DEVICE

TECHNICAL FIELD

The present invention relates to a liquid crystal display device. More specifically, the present invention relates to a liquid crystal display device suitable for a display device for gaming machines such as slot machines.

BACKGROUND ART

Liquid crystal display devices, which have characteristics such as a light weight, a thin profile, and low power consumption, have been used as display devices for devices such as OA equipment (e.g. personal computers) and personal digital assistants in various fields. Liquid crystal display devices have also been used for gaming machines such as slot machines. A liquid crystal display device for gaming machines is mounted to the front surface of the housing of a gaming machine.

A liquid crystal display panel included in a liquid crystal display device for gaming machines has basically the same structure as common display devices in terms of having an image display portion capable of displaying images, but has a transmissive portion at the center of the image display portion. For example, a slot machine including such a liquid crystal display device lets the player view the rotatable reel placed inside the housing from the outside through the transmissive portion.

Hereinafter, an object visible to the viewer through the transmissive portion of a liquid crystal display panel is also referred to as a display object. The display object is disposed behind the liquid crystal display device and the liquid crystal display panel.

Liquid crystal display devices for gaming machines and gaming machines which have been disclosed are described below.

Patent Literature 1 discloses a liquid crystal display device including a transmissive liquid crystal display panel disposed at the front-surface side of a rotatable reel, and a backlight that is disposed between the liquid crystal display panel and the rotatable reel and illuminates the liquid crystal display panel from the back-surface side of the panel. The liquid crystal display panel includes an image display portion in which a liquid crystal material is enclosed between a pair of substrates and which is capable of displaying images, and a transmissive portion which faces the rotatable reel and in which a liquid crystal material is not enclosed.

Patent Literature 2 discloses a liquid crystal display device including a transmissive liquid crystal display panel disposed at the front-surface side of a display medium providing variable display, and a pair of polarizing plates disposed on the respective outer surfaces of the liquid crystal display panel. The liquid crystal display panel includes an image display portion capable of displaying images, a transmissive display portion having substantially a quadrangular shape corresponding to the region in which a display medium is arranged, and a light-shielding portion arranged between the image display portion and the transmissive display portion. Each of the pair of polarizing plates includes an opening that has substantially a quadrangular shape corresponding to the region in which the display medium is arranged. An edge defining the opening is positioned in the light-shielding portion of the liquid crystal display panel.

Patent Literature 3 discloses a technique of forming an opening not having the polarizing properties in the polarizing plate that covers light-transmitting portions in the substantial center portion of a liquid crystal display in the case of mounting the liquid crystal display to the front decorative plate of a gaming machine providing slot-machine-like display.

Patent Literatures 4 to 6 each disclose a slot machine including a liquid crystal display panel mounted in the effect-presenting panel; a sub-reel device with sub-reels disposed at the back-surface side of the display window formed in the liquid crystal display panel; and a main reel device with main reels, on the upper side of the effect-presenting panel.

Also, liquid crystal display devices including a fixed display portion in which a color layer having a predetermined pattern is formed have been developed. For example, Patent Literature 7 discloses a liquid crystal display device including: a liquid crystal cell; a polarizing component provided on at least one of the front and back sides of the liquid crystal cell; a first light-transmitting substrate provided on the front side of the front polarizing component; a fixed display portion that is formed from a first light-transmitting color layer and is formed on the first light-transmitting substrate; and a polarizing-component-removed portion that is formed in at least one of the polarizing components and corresponds to the fixed display portion.

CITATION LIST

Patent Literature

Patent Literature 1: JP 2007-127940 A
Patent Literature 2: JP 2006-343728 A
Patent Literature 3: JP 2004-105616 A
Patent Literature 4: JP 2005-52195 A
Patent Literature 5: JP 2005-52196 A
Patent Literature 6: JP 2005-52198 A
Patent Literature 7: JP H09-265087 A

SUMMARY OF INVENTION

Technical Problem

In a liquid crystal display device having a structure that allows a display object such as a meter and a rotatable reel to be visible through a transmissive portion of the liquid crystal display panel, such an opening can be formed in a polarizing plate correspondingly to the transmissive portion to increase the transmittance of the transmissive portion for better visibility of the display object behind. However, the opening causes display defects such as stains and unevenness around the transmissive portion in the image display portion.

The reasons are described below. A polarizing plate has a function of blocking ultraviolet light, which prevents the liquid crystal in the image display portion from being irradiated with ultraviolet light. However, when an opening corresponding to the transmissive portion is formed in the polarizing plate, the liquid crystal in the transmissive portion is irradiated with ultraviolet light in external light and/or ultraviolet light in the light from the display-object illumination lamp behind. Thereby, the liquid crystal in the transmissive portion is deteriorated. The deteriorated liquid crystal spreads to the image display portion, producing display defects such as stains and unevenness in the image display portion.

Patent Literature 2 discloses in paragraph [0039] that even when display defects occur around the image display portion, light is blocked by the light-shielding portion provided between the image display portion and the transmissive portion. However, when the liquid crystal in the transmissive portion is deteriorated by ultraviolet light and the deteriorated liquid crystal spreads over the light-shielding portion to the image display portion over long-term use, display defects such as stains and unevenness occur eventually.

The liquid crystal display device of Patent Literature 1 can also be further improved. First, the general configuration of the liquid crystal display device described in Patent Literature 1 is described. FIG. 13 is a schematic plan view of a liquid crystal display panel included in the liquid crystal display device described in Patent Literature 1.

As illustrated in FIG. 13, the liquid crystal display device of Patent Literature 1 includes a liquid crystal display panel 102. The liquid crystal display panel 102 includes an array substrate 103 and a counter substrate 104 that are in pairs; an image display portion 106A in which a liquid crystal material is enclosed between the array substrate 103 and the counter substrate 104 and which is configured to display images; and a transmissive portion 106B in which no liquid crystal material is enclosed. The image display portion 106A is formed in a region defined by a loop first seal 151 and a loop second seal 152 that is arranged in a region defined by the first seal 151. The transmissive portion 106B is formed in a region defined by the second seal 152.

The liquid crystal display device of Patent Literature 1 can be improved in terms of the following points (1) to (4). FIG. 14 is a schematic plan view of the liquid crystal display panel included in the liquid crystal display device described in Patent Literature 1. FIGS. 15 and 16 are schematic cross-sectional views of the liquid crystal display panel included in the liquid crystal display device described in Patent Literature 1.

(1) When the second seal 152 is uncured, a pressure difference is generated between the pressure from the transmissive portion 106B side to the second seal 152 and the pressure from the image display portion 106A to the second seal 152. As a result, as illustrated in FIG. 14, seal defects such as a seal cut 153 and a seal projection 154 may occur. The seal cut is a phenomenon that the second seal 152 is partly cut. The seal projection is a phenomenon that the second seal 152 partly projects into the image display portion 106A or into the transmissive portion 106B.

When the seal cut 153 is generated, the second seal 152 cannot enclose the liquid crystal material in a certain region, letting the liquid crystal material in the image display portion 106A flow into the transmissive portion 106B. This phenomenon leads to uneven cell thickness in the image display portion 106A. Also, impurities enter the liquid crystal material through the seal cut 153, deteriorating the liquid crystal material. The seal cut 153 may therefore produce display defects such as stains and unevenness in the image display portion 106A. In addition, when the liquid crystal material flows into the transmissive portion 106B, light passing through the liquid crystal material may be scattered because the liquid crystal material is not aligned in the transmissive portion 106B. The seal cut 153 may therefore cause transmittance unevenness in the transmissive portion 106B.

When the seal projection 154 is generated, part of the second seal 152 sticks out of the designed formation range. The second seal 152, when projecting to the image display portion 106A, may cause lighting defects at the site where the second seal 152 has entered the image display portion 106A. Also, the uncured second seal 152 may be mixed into the liquid crystal material in the image display portion 106A, deteriorating the liquid crystal material. The seal projection 154 may therefore cause display defects such as stains and unevenness in the image display portion 106A. When the second seal 152 spreads into the transmissive portion 106B, the transmittance unevenness occurs at the site where the second seal 152 sticks out.

(2) As illustrated in FIG. 15, a refractive index difference is generated between an air layer 180 in the transmissive portion 106B and each of glass substrates 131 and 141 and alignment layers 132 and 144. Such a refractive index difference may increase the reflection in the interfaces between the air layer and these components, thereby decreasing the transmittance of the transmissive portion 106B. Also, with a high reflectance, the uneven cell thickness in the transmissive portion 106B may allow Newton's rings to be easily visible, which deteriorates the display quality of the transmissive portion 106B.

(3) One drop filling of the liquid crystal material and attachment of the array substrate 103 and the counter substrate 104 to each other are performed under reduced pressure. Accordingly, as illustrated in FIG. 16, the internal pressure of the cell in the transmissive portion 106B is lower than the atmospheric pressure (white arrow in FIG. 16) to the transmissive portion 106B, which means that the internal pressure of the cell in the transmissive portion 106B is a negative pressure. For this reason, the cell thickness of the transmissive portion 106B decreases. This uneven cell thickness of the transmissive portion 106B may affect the cell thickness of the image display portion 106A, and in that case, the display quality of the image display portion 106A may be deteriorated. It is also possible to arrange a large number of spacers to maintain the cell thickness of the transmissive portion 106B, but this arrangement decreases the transmittance of the transmissive portion 106B and thus deteriorates the visibility in the transmissive portion.

(4) When the components of the counter substrate 104 (e.g. black matrix (BM), color filters) and/or the components of the array substrate 103 (e.g. pixel electrodes, conductive lines) are eliminated from the transmissive portion 106B in order to increase the transmittance in the transmissive portion 106B, the total thicknesses of the components of the counter substrate 104 and/or the array substrate 103 on the top and/or bottom of the spacers are different between the transmissive portion 106B and the image display portion 106A. This difference causes the cell to fail to maintain a uniform thickness between the image display portion 106A and the transmissive portion 106B. Also, since the internal pressure of the cell in the transmissive portion 106B is a negative pressure as described above, the influence of the elimination of the components is more significant. Accordingly, the components of the counter substrate 104 and/or the array substrate 103 on the top and/or the bottom of the spacers in the transmissive portion 106B cannot be eliminated, and thus the transmittance in the transmissive portion 106B cannot be increased. Hence, the visibility in the transmissive portion 106B cannot be improved.

The present invention was made in view of the above state of the art, and aims to provide a liquid crystal display device capable of suppressing display defects in the image display portion, improving the display quality in the image display portion and the transmissive portion, improving the visibility in the transmissive portion, and improving the long-term reliability.

Solution to Problem

One aspect of the present invention may be a liquid crystal display device provided with a liquid crystal display panel, the liquid crystal display panel including:

a transmissive portion that allows a region behind the liquid crystal display panel to be visible;

an image display portion that includes pixels and is configured to display images;

a first liquid crystal layer provided correspondingly to the image display portion;

a second liquid crystal layer provided correspondingly to the transmissive portion; and a seal surrounding the second liquid crystal layer, the first liquid crystal layer and the second liquid crystal layer being separated by the seal.

Hereinafter, this liquid crystal display device is also referred to as the liquid crystal display device of the present invention.

Preferred embodiments of the liquid crystal display device of the present invention are described below. The following preferred embodiments may be appropriately combined with each other. A combination of any two or more of the following preferred embodiments is also one preferred embodiment.

The second liquid crystal layer may contain a non-aligned liquid crystal.

The second liquid crystal layer may contain an aligned liquid crystal.

In this case, the liquid crystal display panel may include a pair of substrates between which the first liquid crystal layer and the second liquid crystal layer are sandwiched, each of the pair of substrates may include an alignment film provided across the image display portion and the transmissive portion, and the alignment film may have been subjected to the same alignment treatment both in the image display portion and in the transmissive portion, or may not have been subjected to an alignment treatment either in the image display portion or in the transmissive portion.

The liquid crystal display device may have a configuration that the liquid crystal display panel includes first spacers provided in the image display portion and second spacers provided in the transmissive portion, and an arrangement density of the second spacers is smaller than an arrangement density of the first spacers, and/or a contact area of the second spacers is smaller than a contact area of the first spacers.

The liquid crystal display device may have a configuration that the liquid crystal display panel includes:

a pair of substrates between which the first liquid crystal layer and the second liquid crystal layer are sandwiched;

a first spacer provided in the image display portion; and a second spacer provided in the transmissive portion, and at least one of the pair of substrates includes an insulating substrate and a component provided between the insulating substrate and the first spacer, while not including a component formed by the same material as the above-described component between the insulating substrate and the second spacer.

The liquid crystal display device may have a configuration that the liquid crystal display panel includes a pair of substrates between which the first liquid crystal layer and the second liquid crystal layer are sandwiched, and the structure of at least one of the pair of substrates is different between the image display portion and the second transmissive portion.

In this case, one of the pair of substrates may include at least one of a color filter layer, a black matrix, and a counter electrode, and the at least one of the color filter layer, the black matrix, and the counter electrode may not be provided in the transmissive portion but in the image display portion.

The liquid crystal display device may have a configuration that the liquid crystal display device includes a pair of polarizing plates disposed on the respective front and back surfaces of the liquid crystal display panel, and at least one of the pair of polarizing plates does not overlap the transmissive portion but overlaps the image display portion.

In this case, neither of the pair of polarizing plates may overlap the transmissive portion but both of the pair of polarizing plates may overlap the image display portion.

Advantageous Effects of Invention

The present invention can provide a liquid crystal display device capable of suppressing display defects in the image display portion, improving the display quality in the image display portion and the transmissive portion, improving the visibility in the transmissive portion, and improving the long-term reliability.

DESCRIPTION OF EMBODIMENTS

The present invention will be described in more detail below based on embodiments. The embodiments are not intended to limit the scope of the present invention.

Embodiment 1

Figure 1:
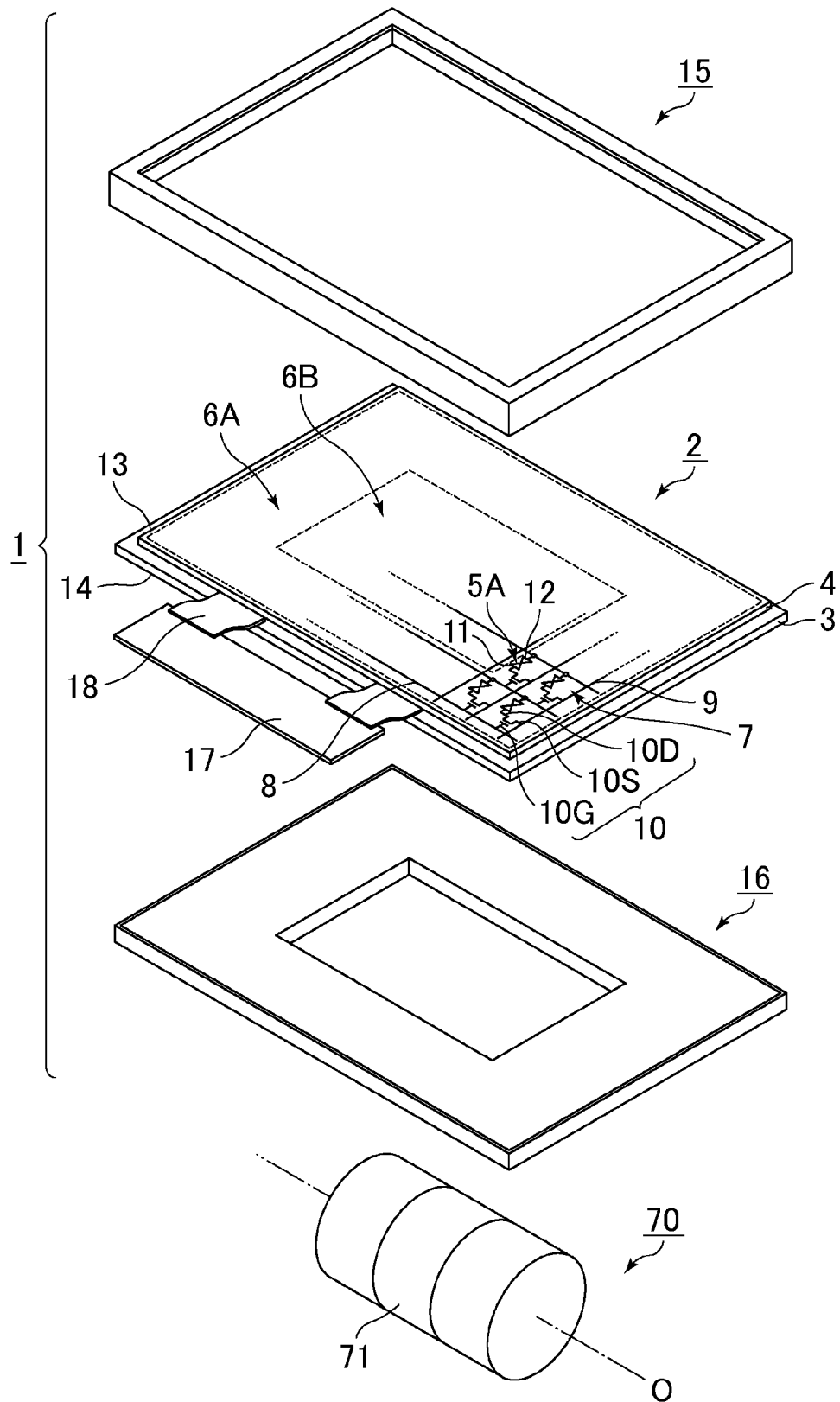
FIG. 1 is an exploded perspective schematic view of a liquid crystal display device of Embodiment 1.
Figure 2:
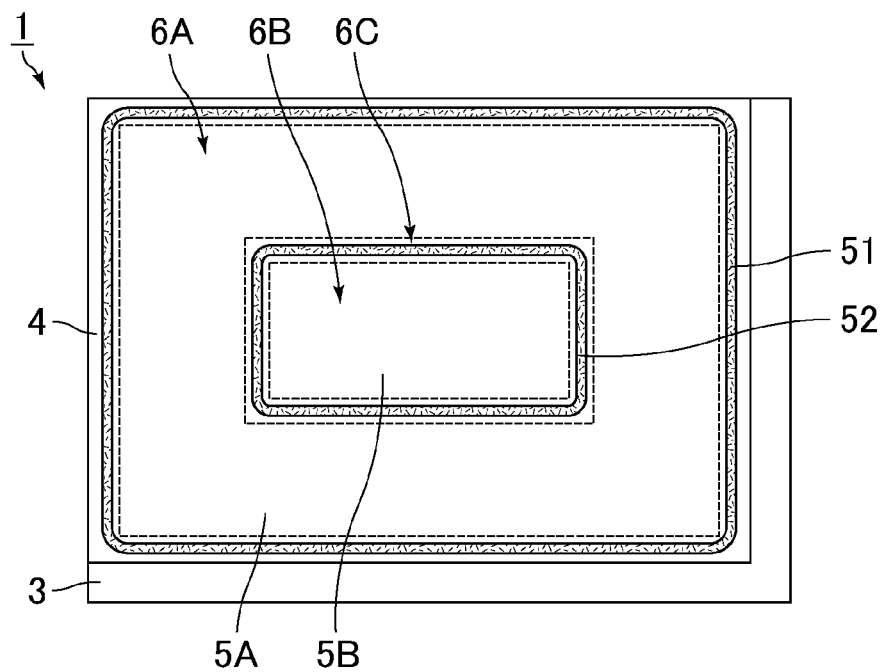
FIG. 2 is a schematic plan view of a liquid crystal display panel included in the liquid crystal display device of Embodiment 1.
Figure 3:
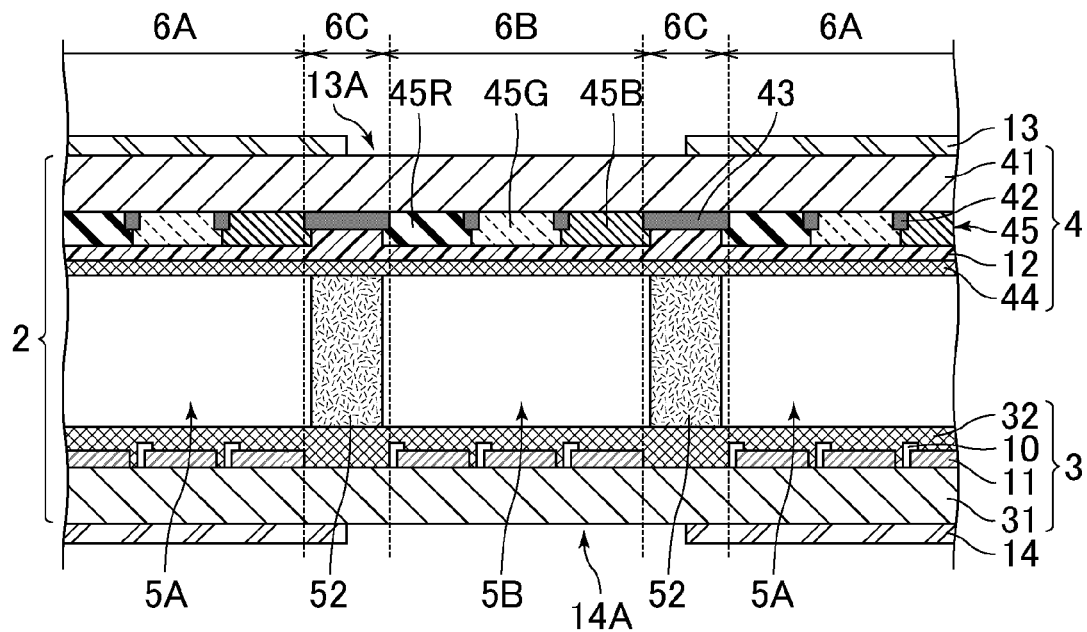
FIG. 3 is a schematic cross-sectional view of the liquid crystal display panel included in the liquid crystal display device of Embodiment 1.

FIG. 1 is an exploded perspective schematic view of a liquid crystal display device of Embodiment 1. FIG. 2 is a schematic plan view of a liquid crystal display panel included in the liquid crystal display device of Embodiment 1. FIG. 3 is a schematic cross-sectional view of the liquid crystal display panel included in the liquid crystal display device of Embodiment 1.

As illustrated in FIG. 1, a liquid crystal display device 1 of the present embodiment is a transmissive liquid crystal display device, and includes a substantially quadrangular flat-plate-like liquid crystal display panel 2. As illustrated in FIGS. 1 to 3, the liquid crystal display panel 2 includes a pair of substrates, namely an array substrate 3 and a counter substrate 4, and a first liquid crystal layer 5A and a second liquid crystal layer 5B that are held between the substrates. The first liquid crystal layer 5A can function as a light modulating layer. The liquid crystal display panel 2 includes an image display portion 6A, a transmissive portion 6B, and a light-shielding portion 6C arranged between the image display portion 6A and the transmissive portion 6B. The transmissive portion 6B is a portion where a display object disposed behind the liquid crystal display panel 2 such as a rotatable reel 70 is visible (visually observable). The image display portion 6A is a portion where images can be displayed by the liquid crystal. The image display portion 6A is provided to surround the transmissive portion 6B, and includes pixels 7 disposed in a matrix form.

The array substrate 3 includes an insulating substrate 31 such as a glass substrate, and components formed on the insulating substrate 31. The components included in the array substrate 3 are scanning lines 8 that extend in the row direction; signal lines 9 that extend in the column direction; thin-film transistors (TFTs) 10 that are arranged in the vicinities of intersections of the scanning lines 8 and the signal lines 9 in the respective pixels 7 and that function as switching elements; pixel electrodes 11 connected to the respective TFTs 10; and an alignment film 32 that covers these components. These components are formed in the same pattern in the image display portion 6A and the transmissive portion 6B.

Each TFT 10 includes a gate electrode 10G that is electrically connected to the corresponding scanning line 8 or is integrally formed with the corresponding scanning line 8; a source electrode 10S that is electrically connected to the corresponding signal line 9 or is integrally formed with the corresponding signal line 9; and a drain electrode 10D that is electrically connected to the corresponding pixel electrode 11.

The counter substrate 4 includes an insulating substrate 41 such as a glass substrate; a black matrix (BM) 42 that is formed on the insulating substrate 41 and prevents light transmission between the pixels 7; a light-shielding film 43 that is formed on the insulating substrate 41 within the light-shielding portion 6C; a counter electrode 12 that is formed above the insulating substrate 41 and applies common voltage (signals) to all the pixels; and an alignment film 44 that covers these components. The BM 42 is formed in the same pattern in the image display portion 6A and the transmissive portion 6B. The counter electrode 12 is uniformly formed continuously across the image display portion 6A, the transmissive portion 6B, and the light-shielding portion 6C. The counter electrode 12 may be patterned, and may be formed in the same pattern in the image display portion 6A and the transmissive portion 6B. The light-shielding film 43 is formed from the same material as BM 42.

The pixel electrodes 11 and the counter electrode 12 are formed from an electrically conductive material having light transmissivity, such as indium tin oxide (ITO). The counter electrode 12 may be formed above the insulating substrate 31 of the array substrate 3, not above the insulating substrate 41 of the counter substrate 4.

The alignment films 32 and 44, in a plan view, are formed to cover the entire region over the image display portion 6A, the light-shielding portion 6C, and the light-transmissive portion 6B. The liquid crystal is aligned both in the first and second liquid crystal layers 5A and 5B.

The array substrate 3 and the counter substrate 4 are disposed such that the components on the insulating substrates 31 and 41 face each other. Also, spacers (not illustrated) are provided between the array substrate 3 and the counter substrate 4 to give a predetermined space between the array substrate 3 and the counter substrate 4. Furthermore, a first seal 51 and a second seal 52 are formed between the array substrate 3 and the counter substrate 4.

The first and second seals 51 and 52 each are formed to have a continuous loop shape from a sealing material (adhesive), and are in contact with the inner surfaces of the respective array substrate 3 and counter substrate 4. The first and second seals 51 and 52 attach (bond) the array substrate 3 and the counter substrate 4 to each other, and enclose the first and second liquid crystal layers 5A and 5B between the substrates 3 and 4. The inner surface of the array substrate 3 or the counter substrate 4 is one of the pair of main surfaces of the array substrate 3 or the counter substrate 4 that faces the first and second liquid crystal layers 5A and 5B. The outer surface of the array substrate 3 or the counter substrate 4 is one of the pair of main surfaces of the array substrate 3 or the counter substrate 4 that is on the side opposite to the first and second liquid crystal layers 5A and 5B.

The first seal 51 is formed along the end of one of the array substrate 3 and the counter substrate 4 (preferably, the counter substrate 4) to surround the image display portion 6A.

The second seal 52 is formed within the region defined by the first seal 51, and is formed along the border (the light-shielding portion 6C) between the image display portion 6A and the transmissive portion 6B to surround the transmissive portion 6B. The second seal 52 is disposed in the light-shielding portion 6C so as not to be visible from the outside.

The first liquid crystal layer 5A is formed by filling, with a liquid crystal material (liquid crystal composition), the region that is between the substrates 3 and 4 and is surrounded (sandwiched) by the first and second seals 51 and 52. In a plan view, the first liquid crystal layer 5A overlaps at least the entire image display portion 6A, but does not overlap the transmissive portion 6B The second liquid crystal layer 5B is formed by filling, with a liquid crystal material (liquid crystal composition), the region that is between the substrates 3 and 4 and is surrounded by the second seal. In a plan view, the second liquid crystal layer 5B is at least in the entire transmissive portion 6B, but is not in the image display portion 6A.

The second liquid crystal layer 5B is surrounded by the second seal 52, and the second liquid crystal layer 5B and the first liquid crystal layer 5A are separated by the second seal 52. The second seal 52 therefore prevents the liquid crystal in the second liquid crystal layer 5B and the liquid crystal in the first liquid crystal layer 5A from being mixed with each other.

The material of the second seal 52 may be different from the material of the first seal 51, but is preferably the same as the material of the first seal 51. In this case, the material and/or the sealing material application step can be made common to the first and second seals, and an increase in the material cost and/or the number of production steps can be prevented.

The structure in which the second liquid crystal layer 5B and the first liquid crystal layer 5A are separated from each other by the second seal 52 can be produced by one drop filling. The liquid crystal display panel 2 can be produced by steps required in production of a typical liquid crystal display panel, including the steps of: producing an array substrate; producing a counter substrate; and injecting a liquid crystal by one drop filling and attaching the substrates to each other. That is, the liquid crystal display panel 2 can be produced without an increase in the production steps.

The following embodiments are preferred from the viewpoint of making the material and/or alignment treatment common to the transmissive portion 6B and the image display portion 6A and preventing an increase in the material cost and/or the number of production steps.

That is, the liquid crystal material of the second liquid crystal layer 5B and that of the first liquid crystal layer 5A may be different from each other, but are preferably the same as each other. The liquid crystal in the second liquid crystal layer 5B is preferably aligned in the same manner as the liquid crystal in the first liquid crystal layer 5A. The alignment state of the second liquid crystal layer 5B may be different from the alignment state of the first liquid crystal layer 5A. Still, the liquid crystal in the second liquid crystal layer 5B is preferably aligned in the same manner as the liquid crystal in the first liquid crystal layer 5A. The alignment films 32 and 44 preferably respectively align the liquid crystals in the first and second liquid crystal layers 5A and 5B in the same manner. Examples of the alignment states of the first and second liquid crystal layers 5A and 5B include twisted alignment, vertical alignment, and horizontal alignment. In the case where alignment treatment is required for each of the alignment films 32 and 44, each of the alignment films 32 and 44 is preferably aligned in the same manner in the image display portion 6A and in the transmissive portion 6B. Examples of the alignment treatment include rubbing treatment and photo-alignment treatment. The alignment treatment for each of the alignment films 32 and 44 is preferably performed under the same conditions in the image display portion 6A and the transmissive portion 6B. In the case where the alignment treatment is not necessary for the alignment films 32 and 44, for example in the case where the alignment films 32 and 44 are vertical alignment films which vertically align the liquid crystals without alignment treatment for the alignment films 32 and 44, each of the alignment films 32 and 44 is preferably not subjected to alignment treatment either in the image display portion 6A or in the transmissive portion 6B. Whether or not the alignment films 32 and 44 are subjected to alignment treatment can be appropriately determined according to the display mode of the liquid crystal display panel 2. Examples of the display mode of the liquid crystal display panel 2 include the twisted nematic (TN) mode, the vertical alignment (VA) mode, the in-plane switching (ISN) mode, and the fringe field switching (FFS) mode.

Generally, a decrease in the transmittance due to light scattering by an aligned liquid crystal can be disregarded. Accordingly, a decrease in the transmittance due to light scattering by the aligned liquid crystal in the second liquid crystal layer 5B can also be disregarded.

Yet, the liquid crystal in the second liquid crystal layer 5B may not be aligned. A non-aligned liquid crystal is in a milky color, and has a lower transmittance than an aligned liquid crystal. This is because many small spots with different alignment directions are generated, and light is scattered in the interfaces of the spots. In order to ensure the transmittance of the transmissive portion 6B, the liquid crystal in the second liquid crystal layer 5B is preferably aligned as described above. Still, if the transmittance of the transmissive portion 6B is not necessarily high or the transmissive portion 6B is made to have a frosted-glass appearance, the liquid crystal in the second liquid crystal layer 5B is preferably not aligned.

In order not to align the liquid crystal in the second liquid crystal layer 5B, in the case where the alignment films 32 and 44 are made of a material that need to be subjected to alignment treatment, each of the alignment films 32 and 44 may simply not be subjected to alignment treatment in the transparent portion 6B. Also, while the alignment films 32 and 44 are formed in the image display portion 6A, at least one of the alignment films 32 and 44 may not be formed in the transmissive portion 6B.

Regardless of whether the liquid crystal in the second liquid crystal layer 5B is aligned or not, a decrease in the transmittance due to light absorption by the liquid crystal is generally very small, and thus a decrease in the transmittance due to light absorption hardly occurs in the second liquid crystal layer 5B.

On the front surface (viewer-side surface) and the back surface (backlight-side surface, i.e., the rear-side surface) of the liquid crystal display panel 2, respectively, a polarizing plate 13 and a polarizing plate 14 in pairs are disposed. That is, the polarizing plates 13 and 14 are respectively disposed on the outer surface of the counter substrate 4 and the outer surface of the array substrate 3. The polarization directions of the polarizing plates 13 and 14 are appropriately set to suit the characteristics of the first liquid crystal layer 5A. The polarizing plates 13 and 14 are usually disposed in crossed Nicols or parallel Nicols.

The polarizing plates 13 and 14 are respectively provided with an opening 13A and an opening 14A. In a plan view, the openings 13A and 14A overlap the entire transmissive portion 6B, and the ends of the openings 13A and 14A overlap the light-shielding portion 6C. The polarizing plates 13 and 14 therefore do not overlap the transmissive portion 6B at all but they overlap the entire image display portion 6A.

Here, one of the openings 13A and 14A may be formed, and one of the polarizing plates 13 and 14 may be in the entire region over the transmissive portion 6B and the image display portion 6A.

The polarizing plates 13 and 14 each are usually a linear polarizing plate including a linear polarizer. Typical examples of the linear polarizer include those obtained by adsorption alignment of a dichroic anisotropic material such as an iodine complex on a polyvinyl alcohol (PVA) film. For the mechanical strength and wet heat resistance, each of the polarizing plates 13 and 14 usually further includes a protective film such as a triacetyl cellulose (TAC) film that is laminated on each side of the PVA film by an adhesive layer.

The polarizing plates 13 and 14 each preferably have a function of blocking ultraviolet light. Thereby, deterioration of the liquid crystal in the first liquid crystal layer 5A due to ultraviolet light can be suppressed. Examples of the specific method of providing a function of blocking ultraviolet light to the polarizing plates 13 and 14 include, but are not particularly limited to, a method utilizing as a protective film a TAC film to which an ultraviolet absorber is added.

The liquid crystal display device 1 may provide monochrome display or color display. In the case of color display, each pixel 7 in the liquid crystal display panel 2 includes sub-pixels in multiple colors, such as a red pixel displaying a red (R) color, a green pixel displaying a green (G) color, and a blue pixel displaying a blue (B) color, and a color filter layer 45 including multiple color filters such as a red color filter 45R, a green color filter 45G, and a blue color filter 45B is formed on the insulating substrate 41 of the counter substrate 4. The red, green, and blue color filters 45R, 45G, and 45B respectively transmit light rays having dominant wavelengths of red, green, and blue. The red pixel, the green pixel, and the blue pixel are respectively provided with the red, green, and blue color filters 45R, 45G, and 45B. The color filter layer 45 may be formed on the insulating substrate 31 of the array substrate 3, not on the insulating substrate 41 of the counter substrate 4.

The liquid crystal display panel 2 is disposed between a quadrangular frame-like bezel cover 15 and a backlight 16 serving as a surface light source device. That is, the backlight 16 is integrated with the bezel cover 15 together with the liquid crystal display panel 2, with its surface (emission surface) facing the back surface (array substrate) of the liquid crystal display panel 2, so that the backlight 16 illuminates the liquid crystal display panel 2 from the back-surface side of the panel.

A driver circuit 17 that supplies drive signals to the liquid crystal display panel 2 is electrically connected to the liquid crystal display panel 2 via a flexible printed circuit board 18. The driver circuit 17 is disposed on the back-surface side of the backlight 16 by curving the printed circuit board 18.

Figure 4:
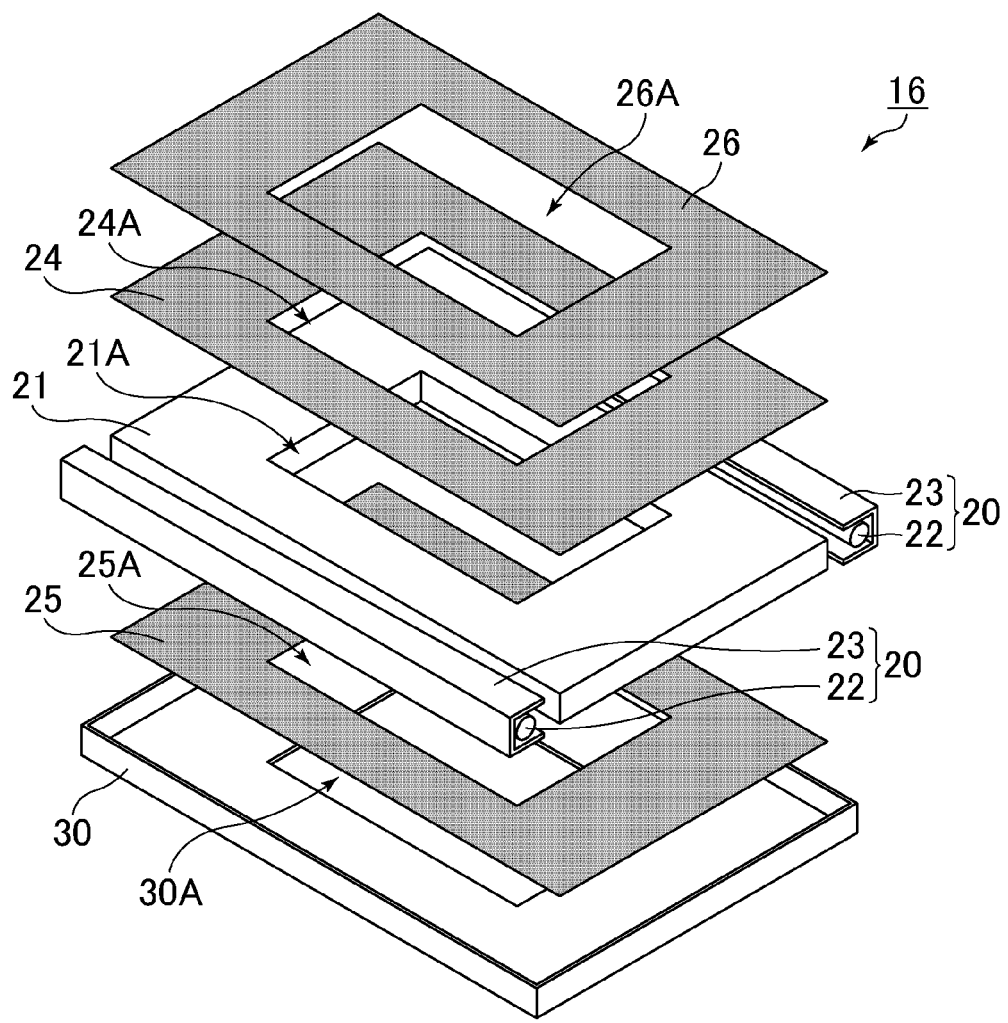
FIG. 4 is an exploded perspective schematic view of a backlight included in the liquid crystal display device of Embodiment 1.

FIG. 4 is an exploded perspective schematic view of a backlight included in the liquid crystal display device of Embodiment 1.

As illustrated in FIG. 4, the backlight 16 is provided with components such as a pair of light source portions 20, a light guide plate 21, optical sheets 24 to 26, and a frame 30. Each light source portion 20 is provided with a cold cathode tube 22 serving as a light source, and a lamp reflector 23. The cold cathode tube 22 is an elongated cylindrical light source that extends in the longitudinal direction of the light guide plate 21 which has a substantially quadrangular shape. The lamp reflector 23 is designed to reflect light emitted by the cold cathode tube 22 toward the light guide plate 21, and is disposed to surround the cold cathode tube 22.

The light guide plate 21 is formed from a resin material having light transmissivity, such as an acrylic resin and a polycarbonate-based resin. The light guide plate 21 is formed to have a substantially quadrangular shape and to have a substantially uniform thickness throughout its body.

The light source portions 20, in pairs, are disposed on the outer sides of the light guide plate 21 along the respective long sides in pairs of the light guide plate 21. The cold cathode tubes 22 are disposed substantially in parallel with the side surfaces along the respective long sides of the light guide plate 21.

Light emitted by each cold cathode tube 22 is incident on the light guide plate 21 from the side surface of the light guide plate 21 that faces the cold cathode tube 22. The light guide plate 21 can spread the incident light to emit the light from the main surface (emission surface) thereof that faces the liquid crystal display panel 2.

The optical sheet 24 has a substantially quadrangular shape of substantially the same size as the outer size of the light guide plate 21, and is disposed to cover the emission surface of the light guide plate 21. The optical sheet 24 provides the predetermined optical properties to the light emitted by the light guide plate 21. For example, the optical sheet 24 is a light-condensing sheet that has a function of condensing the light emitted by the light guide plate 21.

The optical sheet 26 has a substantially quadrangular shape of substantially the same size as the outer size of the light guide plate 21, and is laminated on the optical sheet 24. The optical sheet 26 provides the predetermined optical properties to the light emitted by the light guide plate 21. For example, the optical sheet 26 is a diffusing sheet that has a function of diffusing the light emitted by the light guide plate 21.

The optical sheet 25 has a substantially quadrangular shape of substantially the same size as the outer size of the light guide plate 21, and is disposed to cover the main surface (back surface) of the light guide plate 21 on the side opposite to the liquid crystal display panel 2. The optical sheet 25 is a reflective sheet which has a light reflection function. Although part of light incident on the light guide plate 21 leaks from the back surface, the optical sheet 25 reflects the light leaking from the back surface toward the light guide plate 21 again.

The frame 30 has a substantially quadrangular shape, and houses the light source portions 20, the light guide plate 21, and the optical sheets 24 to 26.

The backlight 16 having the above configuration emits uniform light from its emission surface, and illuminates the back surface of the liquid crystal display panel 2. The light falling on the liquid crystal display panel 2 can selectively pass through the image display portion 6A of the liquid crystal display panel 2. Thereby, the image display portion 6A can display an image.

Figure 5:
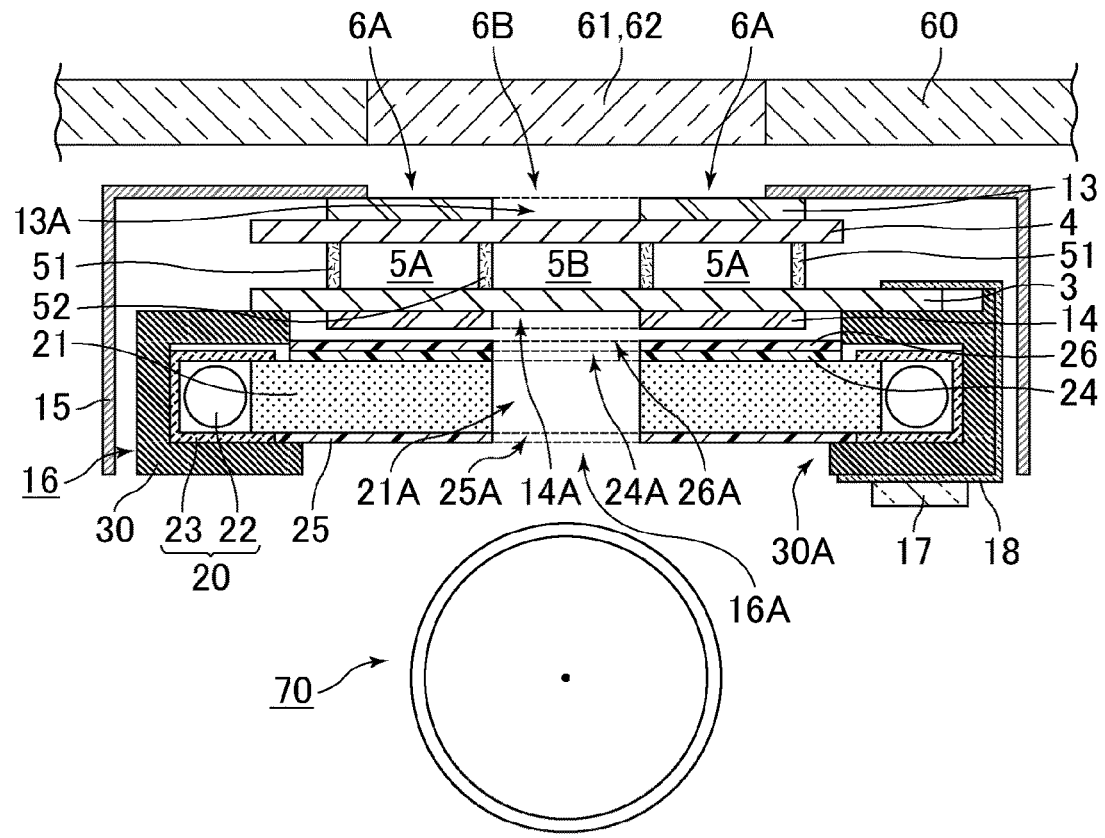
FIG. 5 is a schematic cross-sectional view of a gaming machine including the liquid crystal display device of Embodiment 1.

Next, a gaming machine (e.g. slot machine) provided with the liquid crystal display device 1 is described. FIG. 5 is a schematic cross-sectional view of a gaming machine including the liquid crystal display device of Embodiment 1.

As illustrated in FIGS. 1 and 5, the gaming machine provided with the liquid crystal display device 1 includes a housing 60, the liquid crystal display device 1, and the rotatable reel 70 serving as a display medium capable of providing variable display. The liquid crystal display device 1 and the rotatable reel 70 are disposed inside the housing 60.

The rotatable reel 70 is provided with multiple (e.g. three) cylindrical reel bodies 71 which are rotatable about a rotational axis O. A reel tape (not illustrated) on which symbols are arranged at equal intervals is attached to the cylindrical surface of each reel body 71.

The liquid crystal display device 1 is disposed in front (the viewer side) of the rotatable reel 70 inside the housing 60. The liquid crystal display panel 2 is disposed in front of the rotatable reel 70, and the backlight 16 is disposed between the liquid crystal display panel 2 and the rotatable reel 70.

The housing 60 includes a window portion 61 allowing an image displayed by the liquid crystal display device 1 to be visually observable. The window portion 61 is provided with a protective plate 62 having light transmissivity, such as a glass plate.

The backlight 16 includes, at substantially the center thereof, an opening 16A correspondingly to the arrangement position of the rotatable reel 70. Specifically, as illustrated in FIGS. 4 and 5, the light guide plate 21 and the frame 30 respectively include an opening 21A and an opening 30A which face the rotatable reel 70. Similarly, the optical sheets 24 and 26 respectively include openings 24A and 26A at positions corresponding to the opening 21A. Furthermore, the optical sheet 25 includes an opening 25A at a position corresponding to the opening 21A. Such an opening 16A of the backlight 16 allows a predetermined number of symbols on the rotatable reel 70 disposed behind the backlight 16 to be visually observable. Thereby, the rotatable reel 70 is visually observable without through the backlight 16.

As described above, the liquid crystal display panel 2 includes the image display portion 6A and the transmissive portion 6B, and as illustrated in FIG. 1, the transmissive portion 6B is formed in a region of the liquid crystal panel 2 that faces the rotatable reel 70 when the liquid crystal display panel 2 and the rotatable reel 70 are assembled. The player can therefore view (visually observe) the display object such as the rotatable reel 70 disposed behind the liquid crystal display device 1 through the transmissive portion 6B.

Hereinafter, the main features of the liquid crystal display device 1 of the present embodiment and the effects thereof are described.

In the present embodiment, the second seal 52 surrounds the second liquid crystal layer 5B disposed correspondingly to the transmissive portion 6B. The second liquid crystal layer 5B is separated by the second seal 52 from the first liquid crystal layer 5A disposed correspondingly to the image display portion. The liquid crystal in the second liquid crystal layer 5B can be prevented from being mixed with the liquid crystal in the first liquid crystal layer 5A. Accordingly, even when the liquid crystal in the second liquid crystal layer 5B is deteriorated by ultraviolet light falling on the second liquid crystal layer 5B through the opening 13A in the polarizing plate 13 and/or the opening 14A in the polarizing plate 14, the deteriorated liquid crystal, i.e., the liquid crystal with decreased reliability, can be prevented from spreading into the first liquid crystal layer 5A. As a result, display defects such as stains and unevenness due to the deteriorated liquid crystal can be prevented in the image display portion 6A.

Also, since the second liquid crystal layer 5B and the first liquid crystal layer 5A are separated by the second seal surrounding the second liquid crystal 5B, the deteriorated liquid crystal can be prevented from spreading into the image display portion 6A even when the liquid crystal display device 1 of the present embodiment is subjected to long-term use. Therefore, the long-term reliability can be improved.

Since the second liquid crystal layer 5B is disposed correspondingly to the transmissive portion 6B, the following effects can be achieved unlike the case of employing an air layer in place of the second liquid crystal layer 5B.

(1) In the step of injecting a liquid crystal by one drop filling and attaching the substrates to each other, the liquid crystal material is present at both the inner side and the outer side of the region defined by the uncured material of the second seal 52. Hence, the difference between the inner side pressure and the outer side pressure onto the second seal 52 can be decreased. This structure prevents generation of seal defects such as a seal cut and a seal projection in the second seal 52. Accordingly, display defects such as stains, unevenness, and poor lighting in the image display portion 6A can be suppressed. Also, since transmittance unevenness in the transmissive portion 6B can be suppressed, the visibility in the transmissive portion 6B can be improved.

(2) The liquid crystal material of the second liquid crystal layer 5B and the material of each of the alignment films 32 and 44 can each be a material having the same refractive index as that of the material of the insulating substrates 31 and 41, such as glass. Therefore, reflection in the interfaces in the liquid crystal display panel 2, for example in the interfaces between the second liquid crystal layer 5B and the alignment films 32 and 44, can be suppressed. The visibility in the transmissive portion 6B can thus be improved. Specifically, the transmittance in the transmissive portion 6B can be increased, so that the visibility of the display object behind the liquid crystal display device 1 can be increased. Also, Newton's rings become not easily visually observable in the transmissive portion 6B, and thus the display quality in the transmissive portion 106B can be improved.

(3) In the transmissive portion 6B, the difference between the atmospheric pressure and the internal pressure of the cell (pressure from the region between the array substrate 3 and the counter substrate 4 to the array substrate 3 and the counter substrate 4) is reduced. Hence, the uniformity of the cell thickness can be maintained in the image display portion 6A and the transmissive portion 6B without an increase in the number of spacers in the transmissive portion 6B. The display quality in the image display portion 6A can therefore be improved. In the transmissive portion 6B, generation of Newton's rings can be suppressed while a decrease in the transmittance can be prevented. Thus, the visibility in the transmissive portion 6B can be increased. Furthermore, the cell thickness can be maintained even if the number of spacers in the transmissive portion 6B is decreased, so that the transmittance in the transmissive portion 6B can be increased. Here, the embodiment in which the number of spacers in the transmissive portion 6B is reduced is described in more detail in the following Embodiment 3.

(4) Since the difference between the internal pressure of the cell and the atmospheric pressure is reduced in the transmissive portion 6B, the cell thickness can be maintained in the region in the transmissive portion 6B where the spacers are arranged even when the components on the insulating substrate 31 and/or the insulating substrate 41, such as the BM 42 and the color filter layer 45, are eliminated or minimized. Hence, the aperture ratio and the transmittance in the transmissive portion 6B can be increased. Here, the embodiment in which the components on the insulating substrate 31 and/or the insulating substrate 41 are eliminated in the region in the transmissive portion 6B where the spacers are arranged is described in more detail in the following Embodiment 3.

As described above, the present embodiment can suppress display defects in the image display portion 6A, improve the display quality in the image display portion 6A and the transmissive portion 6B, improve the visibility in the transmissive portion 6B, and improve the long-term reliability.

At least one of the pair of polarizing plates 13 and 14 does not overlap the transmissive portion 6B, but overlaps the image display portion 6A. Thus, the transmittance in the transmissive portion 6B can be further increased, and the visibility of the display object behind the liquid crystal display device 1 can be further improved.

Embodiment 2

The present embodiment is substantially the same as Embodiment 1 except that the pattern for the array substrate and the counter substrate in the transmissive portion is different. Therefore, in the present embodiment, the features unique to the present embodiment are mainly described, and the same points as those in Embodiment 1 are not described. Also, the same reference signs are provided to the components having the same or similar function in the present embodiment and Embodiment 1, and thus such components are not described in the present embodiment.

Figure 6:
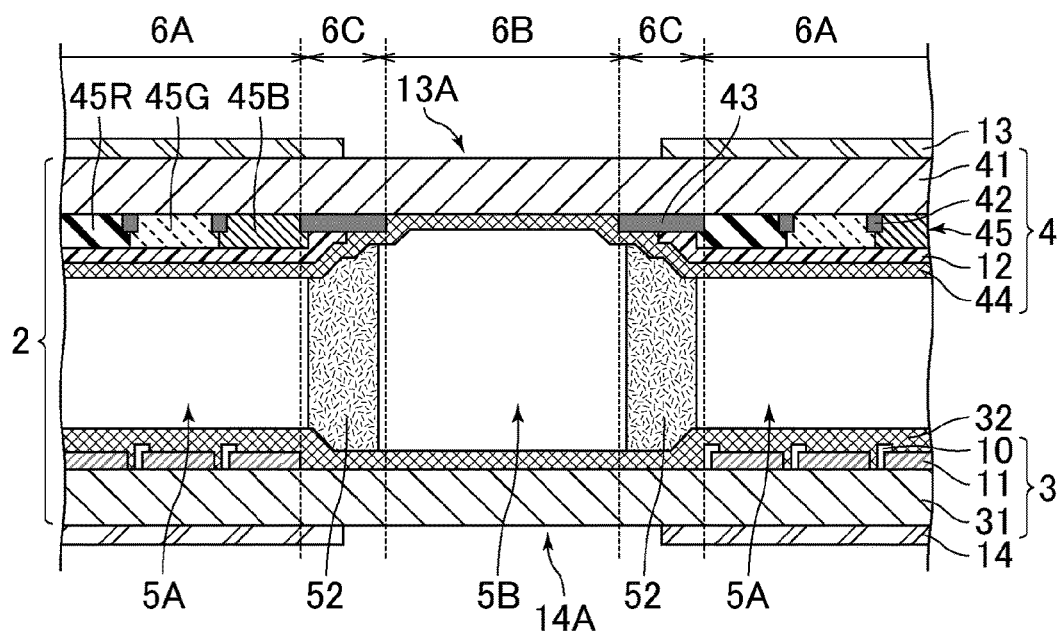
FIG. 6 is a schematic cross-sectional view of a liquid crystal display panel included in a liquid crystal display device of Embodiment 2.
Figure 7:
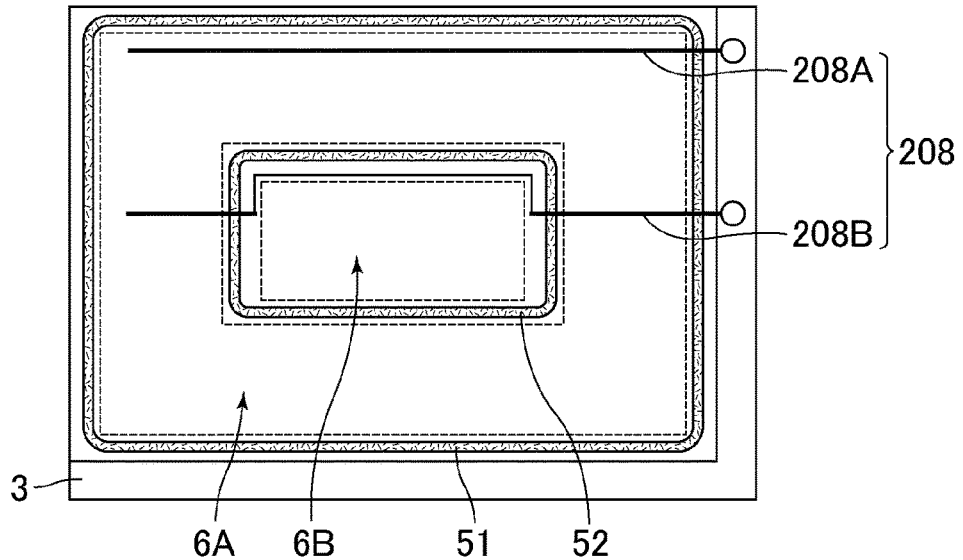
FIG. 7 is a schematic plan view of the liquid crystal display panel included in the liquid crystal display device of Embodiment 2.

FIG. 6 is a schematic cross-sectional view of a liquid crystal display panel included in a liquid crystal display device of Embodiment 2. FIG. 7 is a schematic plan view of the liquid crystal display panel included in the liquid crystal display device of Embodiment 2.

In the present embodiment, similarly to Embodiment 1, images are not displayed by the liquid crystal in the transmissive portion 6B. Thus, any problem would not occur even when the pattern in the image display portion 6A and that in the transmissive portion 6B are not the same. For this reason, as illustrated in FIG. 6, some or all of the components (e.g. the BM 42, the color filter layer 45, the counter electrode 12) on the insulating substrate 41 of the counter substrate 4 are eliminated from the transmissive portion 6B. Also, some or all of the components (e.g. the pixel electrodes 11, the TFTs 10, the conductive lines) on the insulating substrate 31 of the array substrate 3 are eliminated from the transmissive portion 6B. The present embodiment therefore can further increase the transmittance in the transmissive portion 6B compared with Embodiment 1.

For example, in the transmissive portion 6B, the BM 42, the color filter layer 45, and the counter electrode 12 may not be arranged on the insulating substrate 41, and in the transmissive portion 6B, the pixel electrodes 11, the TFTs 10, and the conductive lines (scanning lines and signal lines) may not be arranged on the insulating substrate 31.

Alternatively, on the insulating substrate 31 and/or the insulating substrate 41 in the transmissive portion 6B, a different pattern from that in the image display portion 6A may be provided.

For example, a pattern (e.g. letters) to aid display of the display object behind the liquid crystal display panel can be provided on the insulating substrate 31 and/or the insulating substrate 41.

As illustrated in FIG. 7, the shapes, positions, and/or the widths of conductive lines 208 for signals necessary in the image display portion 6A, such as scanning lines and signal lines, may be changed between the transmissive portion 6B and the image display portion 6A. For example, the conductive lines 208 for signals may include conductive lines 208A crossing the image display portion 6A, and conductive lines 208B crossing the image display portion 6A but deviating from the transmissive portion 6B. The conductive lines 208B may be arranged at the periphery of the transmissive portion 6B, and may have a smaller width than the conductive lines 208A.

Generally, application of DC (direct current) voltage to the liquid crystal may deteriorate the liquid crystal. Still, the liquid crystal in the second liquid crystal layer 5B and the liquid crystal in the first liquid crystal layer 5A are separated by the second seal 52 in the same manner as in Embodiment 1. Thus, even when the liquid crystal in the second liquid crystal layer 5B is deteriorated by being supplied with DC voltage, the image display portion 6A can be prevented from being affected by the deterioration. Accordingly, there is no need to consider the voltage to be applied to the liquid crystal in the second liquid crystal layer 5B, and any electrode and/or conductive line pattern can be provided to the transmissive portion 6B.

As described above, differentiating the structure of at least one of the array substrate 3 and the counter substrate 4 between the image display portion 6A and the transmissive portion 6B enables control of the transmittance in the transmissive portion 6B and improvement of the appearance of the display object behind.

Embodiment 3

The present embodiment is substantially the same as Embodiment 1 except that the structure in the portion where the spacers are arranged is different. Therefore, in the present embodiment, the features unique to the present embodiment are mainly described, and the same points as those in Embodiment 1 are not described. Also, the same reference signs are provided to the components having the same or similar function in the present embodiment and Embodiment 1, and thus such components are not described in the present embodiment.

Figure 8:
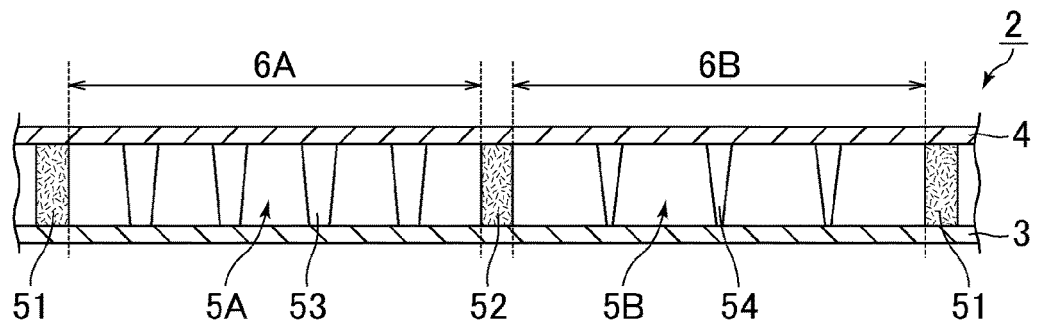
FIG. 8 is a schematic cross-sectional view of a liquid crystal display panel included in a liquid crystal display device of Embodiment 3.
Figure 9:
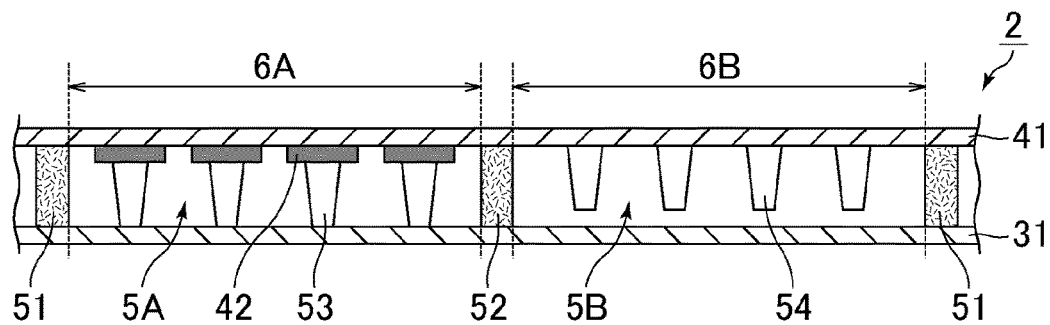
FIG. 9 is a schematic cross-sectional view of the liquid crystal display panel included in the liquid crystal display device of Embodiment 3.

FIG. 8 and FIG. 9 are schematic cross-sectional views of a liquid crystal display panel included in a liquid crystal display device of Embodiment 3.

As illustrated in FIGS. 8 and 9, the liquid crystal display panel 2 of the present embodiment includes first spacers 53 provided in the image display portion 6A and second spacers 54 provided in the transmissive portion 6B. Both of the first and second spacers 53 and 54 are components for maintaining the cell thickness in the image display portion 6A and the transmissive portion 6B. Both of the first and second spacers 53 and 54 are pillar-shaped spacers, and are made of a photosensitive material, for example.

In the transmissive portion 6B, display is not provided by utilizing refractive index anisotropy of the liquid crystal in the second liquid crystal layer 5B. The cell thickness of the transmissive portion 6B therefore is not required to be as uniform as that of the image display portion 6A. Also, as long as the Newton's rings caused by the uneven cell thickness in the transmissive portion 6B are not visually observable and the cell thickness uniformity of the image display portion 6A is not adversely affected, the uneven cell thickness in the transmissive portion 6B does not adversely affect the display quality. Furthermore, the second liquid crystal layer 5B provided correspondingly to the transmissive portion 6B reduces the difference between the internal pressure of the cell and the atmospheric pressure in the transmissive portion 6B, so that the cell thickness of the transmissive portion 6B can be easily maintained.

Hence, as illustrated in FIG. 8, the arrangement density and/or the contact area of the second spacers 54 may be reduced without adversely affecting the uniformity of the cell thickness in the image display portion 6A. Thereby, the aperture ratio and the transmittance in the transmissive portion 6B can be further increased compared with Embodiment 1. As a result of reduction of the arrangement density and/or the contact area of the second spacers 54, the cell thickness of the transmissive portion 6B may be slightly reduced compared with that of the image display portion 6A.

The second liquid crystal layer 5B provided correspondingly to the transmissive portion 6B reduces the difference between the internal pressure of the cell and the atmospheric pressure in the transmissive portion 6B, so that the cell thickness in the transmissive portion 6B can be easily maintained. Therefore, as illustrated in FIG. 9, the components on the insulating substrate 31 and/or the insulating substrate 41, preferably the BM 42 and the color filter layer on the counter substrate 4 and the light-shielding components (e.g. metal conductive lines) and/or the coloring components on the array substrate 3, may be eliminated from the portion where the second spacers 54 are arranged, without adversely affecting the uniformity of the cell thickness of the image display portion 6A. Thereby, the aperture ratio and the transmittance of the transmissive portion 6B can be further increased compared with Embodiment 1. As a result of elimination of the components from the portion where the second spacers 54 are arranged, the cell thickness of the transmissive portion 6B may be slightly reduced compared with that of the image display portion 6A.

As described above, from the viewpoint of increasing the transmittance in the transmissive portion 6B, the arrangement density and/or the contact area of the second spacers 54 may be smaller than the arrangement density and/or the contact area of the first spacers 53 as illustrated in FIG. 8.

Here, how much the arrangement density and/or the contact area of the second spacers 54 are/is reduced compared with the arrangement density and/or the contact area of the first spacers 53 is not particularly limited and can be appropriately determined without adversely affecting the uniformity of the cell thickness in the image display portion 6A.

The arrangement density of the first spacers 53 is a value obtained by dividing the total number of the first spacers 53 by the area of the image display portion 1A. The arrangement density of the second spacers 54 is a value obtained by dividing the total number of the second spacers 54 by the area of the transmissive portion 6B.

The contact area of the first spacers 53 is an average area of the regions occupied by the first spacers 53 in a plan view. The contact area of the second spacers 54 is an average area of the regions occupied by the second spacers 54 in a plan view.

From the viewpoint of increasing the transmittance in the transmissive portion 6B, the array substrate 3 may include components (e.g. metal conductive lines) between the insulating substrate 31 and the first spacers 53, while not including components (e.g. metal conductive lines) made of the same material as the above components between the insulating substrate 31 and the second spacers 54.

From the same viewpoint, as illustrated in FIG. 9, the counter substrate 4 may include components (e.g. BM 42) between the insulating substrate 41 and the first spacers 53, while not including components (e.g. BM 42) made of the same material as the above components between the insulating substrate 41 and the second spacers 54.

Here, which components on the insulating substrate 31 and/or the insulating substrate 41 are eliminated from the transmissive portion 6B is not particularly limited and can be appropriately determined without adversely affecting the uniformity of the cell thickness of the image display portion 6A.

Still, from the viewpoint of surely maintaining the cell thickness, the structures on the insulating substrates 31 and 41 at the arrangement positions of the second spacers 54 are preferably the same as the structures on the insulating substrates 31 and 41 at the arrangement positions of the first spacers 53.

Also, the drop amounts of the liquid crystal material may be differentiated between the image display portion 6A and the transmissive portion 6B for different conditions such as the structures of the counter substrate 4 and/or the array substrate 3 in the transmissive portion 6B and the arrangement density and/or the contact area of the second spacers 54. Thereby, the drop amount of the liquid crystal material in the transmissive portion 6B can be optimized, so that the uniformity of the cell thickness in the transmissive portion 6B can be further improved.

Hereinafter, liquid crystal display devices of comparative embodiments are described.

Comparative Embodiment 1

In a liquid crystal display panel included in a liquid crystal display device of the present comparative embodiment, a sealing material is provided in place of the second liquid crystal layer in the transmissive portion between the array substrate and the counter substrate. However, the material design of the sealing material is not made in consideration of the optical properties, and thus the transmittance of the sealing material is very low. Also, the refractive index of the sealing material is not made the same as that of the glass either, so that the transmittance in the transmissive portion decreases significantly. The thickness of the sealing material is determined to be suitable for the cell thickness by applying the sealing material to the array substrate or the counter substrate and pressurizing the sealing material sandwiched between the array substrate and the counter substrate. Here, the sealing material applied to the entire region of the transmissive portion and the sealing material having the normal width (e.g. the sealing material applied along the end portions of the counter substrate) are different in the compression manner under pressure (the sealing material in the transmissive portion is less likely to be compressed or spread). As a result, the cell thickness becomes uneven.

Comparative Embodiment 2

In a liquid crystal display panel included in a liquid crystal display device of the present comparative embodiment, a spacer material is provided in place of the second liquid crystal layer in the transmissive portion between the array substrate and the counter substrate. However, the material design of the spacer material is not made in consideration of the optical properties, and thus the transmittance of the spacer material is very low. Also, the refractive index of the sealing material is not made the same as that of the glass either, so that the transmittance in the transmissive portion decreases significantly. Moreover, the diameter of the spacers in the image display portion and the diameter of spacer formed by injecting the spacer material in the transmissive portion are greatly different from each other, and thus a difference in the reduction in the thickness of the spacers is generated between the image display portion and the transmissive portion when the array substrate and the counter substrate are attached to each other. As a result, the cell thickness becomes uneven. Here, the heights of the spacers can be differentiated between the image display portion and the transmissive portion in consideration of the difference in the compression ratios, but such a structure requires an extra process in the spacer formation step.

Comparative Embodiment 3

In a liquid crystal display panel included in a liquid crystal display device of the present comparative embodiment, a special material is provided in place of the second liquid crystal layer in the transmissive portion between the array substrate and the counter substrate. Here, a material not used in a common panel production step (a material having the controlled optical properties and the controlled viscosity to prevent generation of uneven cell thickness) is required. This structure therefore requires an extra step of injecting this material in addition to the one drop filling step of the liquid crystal.

As described above, the liquid crystal display devices of Comparative Embodiments 1 to 3 have various disadvantages, exhibiting very low practicability. In contrast, the liquid crystal display devices of Embodiments 1 to 3 can be produced without any new steps or materials, exhibiting very high practicability. Embodiments 1 to 3 are also better than Comparative Embodiments 1 to 3 in terms of the lower probability of generation of display defects due to the uneven cell thickness.

In Embodiments 1 to 3, the liquid crystal display devices for gaming machines have been described. Yet, the use of the liquid crystal display device of each embodiment is not particularly limited and may be, for example, in-vehicle use in which the display object behind the liquid crystal display device is a meter.

A display object is not necessarily disposed behind the liquid crystal display device of each embodiment, and the back, for example the background, may be visible through the transmissive portion.

Also, in each embodiment, the layout of the transmissive portion and the image display portion is not particularly limited, and may be appropriately determined. Here, alternative examples of the layout of the transmissive portion and the image display portion are described.

Figure 10:
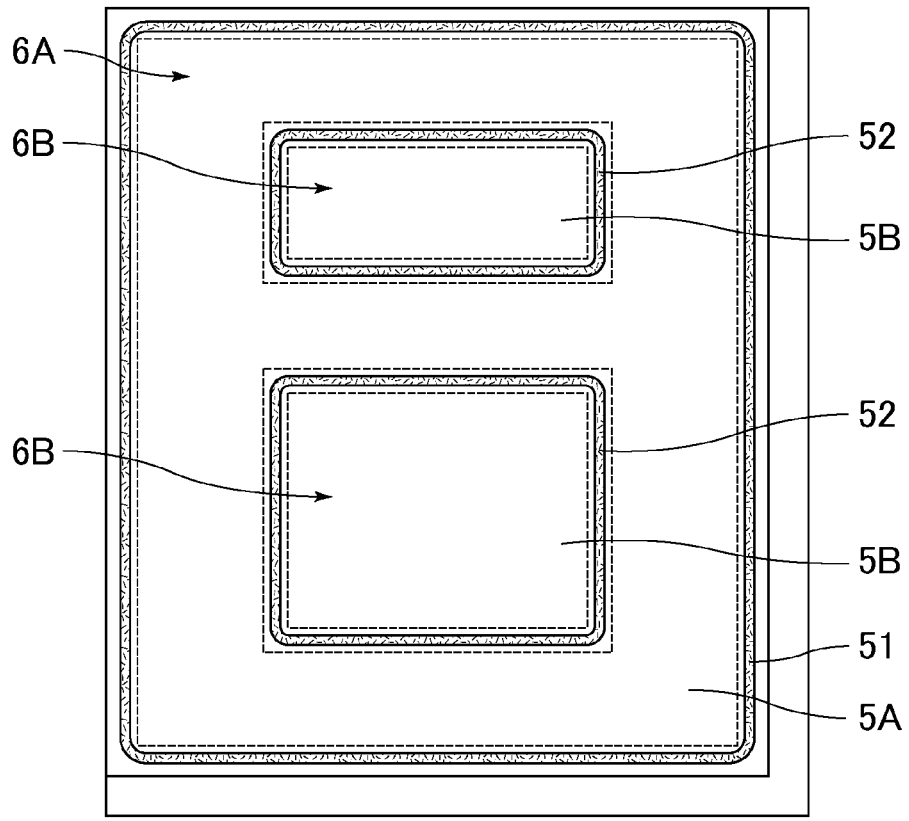
FIG. 10 is a schematic plan view of an alternative example of the liquid crystal display panel included in the liquid crystal display device of any one of Embodiments 1 to 3.
Figure 11:
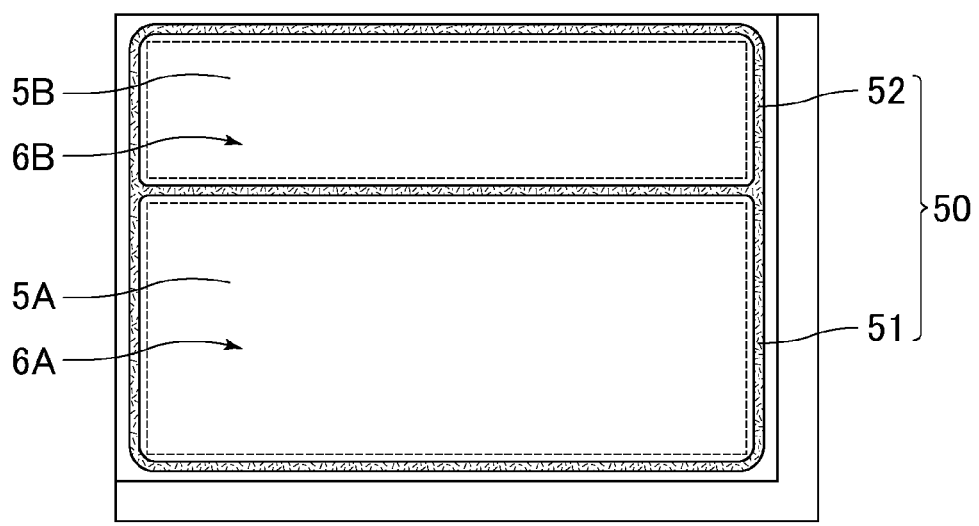
FIG. 11 is a schematic plan view of another alternative example of the liquid crystal display panel included in the liquid crystal display device of any one of Embodiments 1 to 3.
Figure 12:
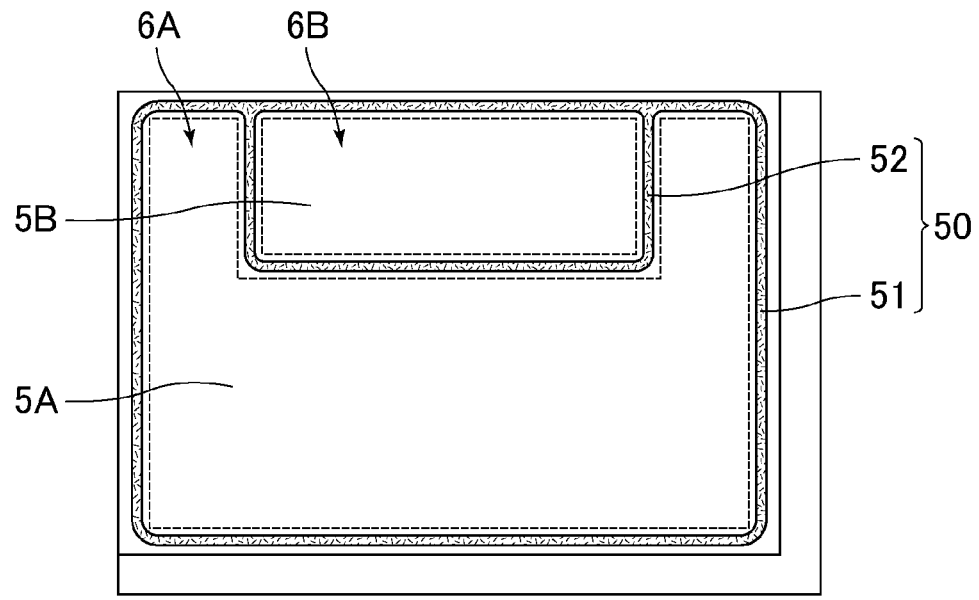
FIG. 12 is a schematic plan view of yet another alternative example of the liquid crystal display panel included in the liquid crystal display device of any one of Embodiments 1 to 3.
Figure 13:
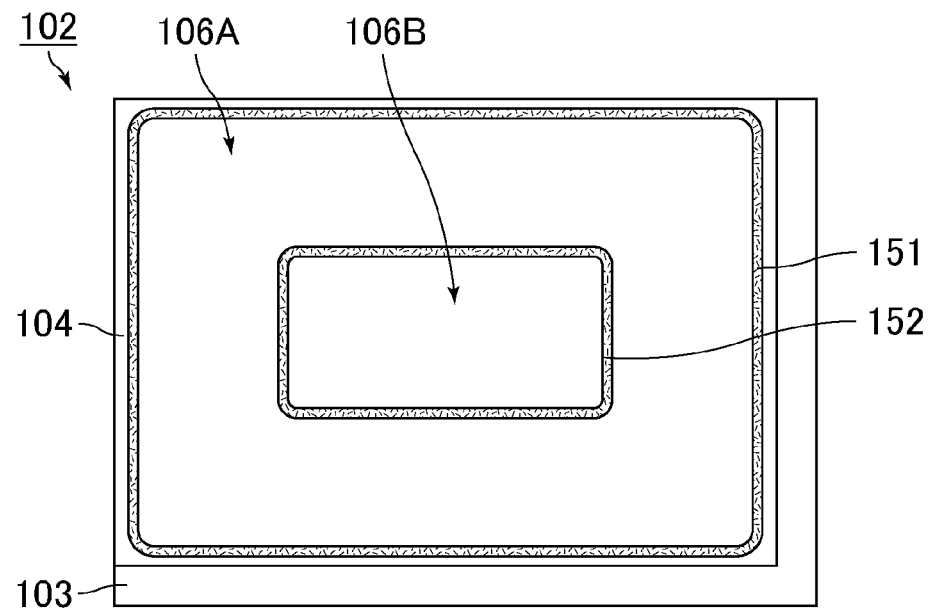
FIG. 13 is a schematic plan view of a liquid crystal display panel included in a liquid crystal display device described in Patent Literature 1.
Figure 14:
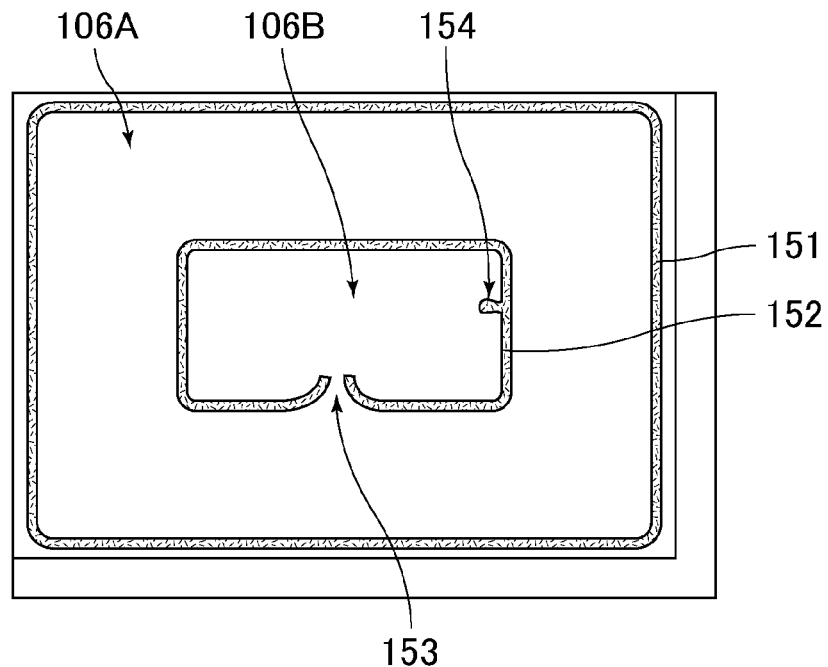
FIG. 14 is another schematic plan view of the liquid crystal display panel included in the liquid crystal display device described in Patent Literature 1.
Figure 15:
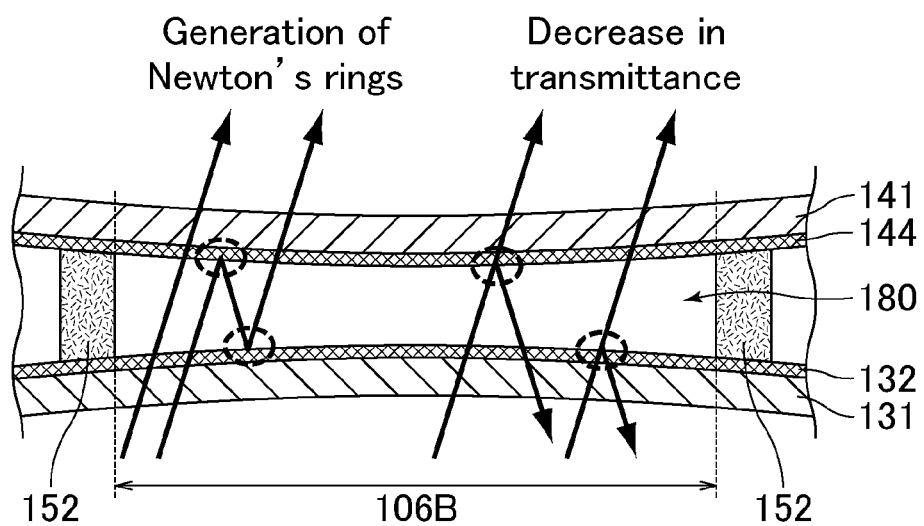
FIG. 15 is a schematic cross-sectional view of the liquid crystal display panel included in the liquid crystal display device described in Patent Literature 1.
Figure 16:
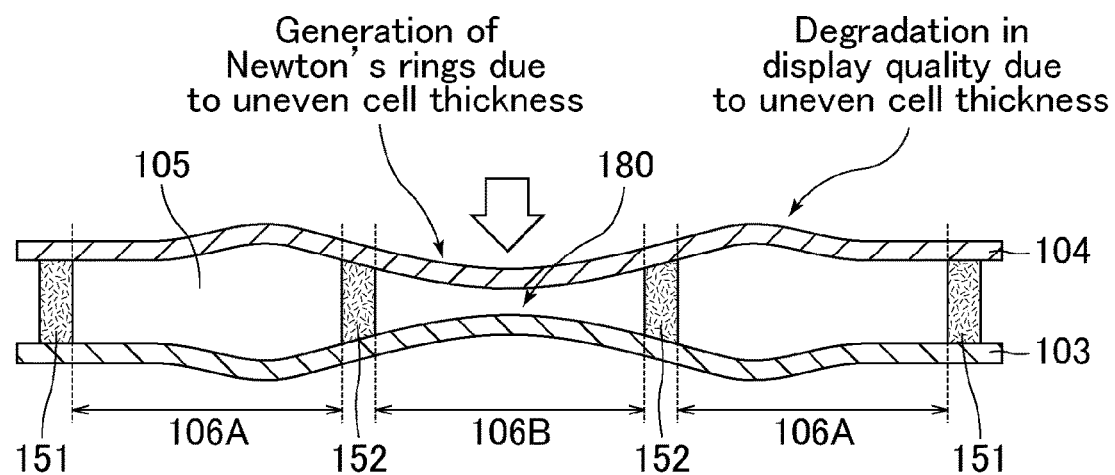
FIG. 16 is another schematic cross-sectional view of the liquid crystal display panel included in the liquid crystal display device described in Patent Literature 1.

FIGS. 10 to 12 each are a schematic plan view of an alternative example of the liquid crystal display panel included in the liquid crystal display device of any one of Embodiments 1 to 3.

As illustrated in FIG. 10, there may be two or more transmissive portions 6B, the second liquid crystal layers 5B corresponding to the respective transmissive portions 6B, and the second seals 52 arranged to surround the respective second liquid crystal layers 5B.

Also, as illustrated in FIGS. 11 and 12, the image display portion 6A may not be formed to surround the transmissive portions 6B entirely, and the image display portion 6A may be provided at part of the periphery of the transmissive portion 6B. In this case, a seal 50 may be formed to surround both the first liquid crystal layer 5A and the second liquid crystal layer 5B. The seal 50 includes a first seal portion 51 corresponding to the above first seal and surrounding the first liquid crystal layer 5A, and a second seal portion 52 corresponding to the above second seal and surrounding the second liquid crystal layer 5B. The part of the seal 50 which is positioned in the border between the transmissive portion 6B and the image display portion 6A is adjacent to both the first and second liquid crystal layers 5A and 5B.

Moreover, the liquid crystal display devices in Embodiments 1 to 3 are transmissive liquid crystal display devices. Still, the liquid crystal display panel of each liquid crystal display device may be a reflective or transflective liquid crystal display device. The liquid crystal display panel may include a reflective display portion which provides display by reflecting external light. In the case of a reflective liquid crystal display device, the backlight may not be provided.

The above embodiments may be appropriately combined with each other without departing from the spirit of the present invention. Also, an alternative example of each embodiment may be combined with another embodiment.

REFERENCE SIGNS LIST

1: liquid crystal display device
2: liquid crystal display panel
3: array substrate
4: counter substrate
5A: first liquid crystal layer
5B: second liquid crystal layer
6A: image display portion
6B: transmissive portion
6C: light-shielding portion
7: pixel
8: scanning line
9: signal line
10: thin-film transistor (TFT)
10G: gate electrode
10S: source electrode
10D: drain electrode
11: pixel electrode
12: counter electrode
13, 14: polarizing plate
13A, 14A: opening in polarizing plate
15: bezel cover
16: backlight
16A: opening in backlight
17: driver circuit
18: printed circuit board
20: light source portion
21: light guide plate
21A: opening in light guide plate
22: cold cathode tube
23: lamp reflector
24 to 26: optical sheet
24A to 26A: opening in optical sheet
30: frame
30A: opening in frame
31, 41: insulating substrate
32, 44: alignment film
42: black matrix (BM)
43: light-shielding film
45: color filter layer
45R: red color filter
45G: green color filter
45B: blue color filter
50: seal
51: first seal (first seal portion)
52: second seal (second seal portion)
53: first spacer
54: second spacer
60: housing
61: window portion
62: protective plate
70: rotatable reel
71: reel body
208: conductive line for signals
208A: conductive line
208B: conductive line

The invention claimed is:
1. A liquid crystal display device provided with a liquid crystal display panel,
the liquid crystal display panel comprising:
a transmissive portion that allows a region behind the liquid crystal display panel to be visible;
an image display portion that includes pixels and is configured to display images;
a first liquid crystal layer provided correspondingly to the image display portion;
a second liquid crystal layer provided correspondingly to the transmissive portion; and
a seal surrounding the second liquid crystal layer, wherein
the first liquid crystal layer and the second liquid crystal layer being separated by the seal; and
the second liquid crystal layer contains an aligned liquid crystal.

2. The liquid crystal display device according to claim 1, wherein the liquid crystal display panel includes a pair of substrates between which the first liquid crystal layer and the second liquid crystal layer are sandwiched,
each of the pair of substrates includes an alignment film provided across the image display portion and the transmissive portion, and
the alignment film has been subjected to the same alignment treatment both in the image display portion and in the transmissive portion, or has not been subjected to an alignment treatment either in the image display portion or in the transmissive portion.

3. The liquid crystal display device according to claim 1, wherein the liquid crystal display panel includes first spacers provided in the image display portion and second spacers provided in the transmissive portion, and
an arrangement density of the second spacers is smaller than an arrangement density of the first spacers, and/or a contact area of the second spacers is smaller than a contact area of the first spacers.

4. The liquid crystal display device according to claim 1, wherein the liquid crystal display panel includes:
a pair of substrates between which the first liquid crystal layer and the second liquid crystal layer are sandwiched;
a first spacer provided in the image display portion; and
a second spacer provided in the transmissive portion, and
at least one of the pair of substrates includes an insulating substrate and a component provided between the insulating substrate and the first spacer, while not including a component formed by the same material as the above-described component between the insulating substrate and the second spacer.

5. A liquid crystal display device provided with a liquid crystal display panel, the liquid crystal display device comprising:
a transmissive portion that allows a region behind the liquid crystal display panel to be visible;
an image display portion that includes pixels and is configured to display images;
a first liquid crystal layer provided correspondingly to the image display portion;
a second liquid crystal layer provided correspondingly to the transmissive portion; and
a seal surrounding the second liquid crystal layer, wherein
the first liquid crystal layer and the second liquid crystal layer is separated by the seal
the liquid crystal display panel includes a pair of substrates between which the first liquid crystal layer and the second liquid crystal layer are sandwiched, and
the structure of at least one of the pair of substrates is different between the image display portion and the second transmissive portion.

6. The liquid crystal display device according to claim 5, wherein one of the pair of substrates includes at least one of a color filter layer, a black matrix, and a counter electrode, and
the at least one of the color filter layer, the black matrix, and the counter electrode is not provided in the transmissive portion but in the image display portion.

7. The liquid crystal display device according to claim 1, wherein the liquid crystal display device includes a pair of polarizing plates disposed on the respective front and back surfaces of the liquid crystal display panel, and
at least one of the pair of polarizing plates does not overlap the transmissive portion but overlaps the image display portion.

8. The liquid crystal display device according to claim 7, wherein neither of the pair of polarizing plates overlaps the transmissive portion but both of the pair of polarizing plates overlap the image display portion.

9. The liquid crystal display device according to claim 5, wherein the liquid crystal display panel includes first spacers provided in the image display portion and second spacers provided in the transmissive portion, and
an arrangement density of the second spacers is smaller than an arrangement density of the first spacers, and/or a contact area of the second spacers is smaller than a contact area of the first spacers.

10. The liquid crystal display device according to claim 5, wherein the liquid crystal display panel includes:
a pair of substrates between which the first liquid crystal layer and the second liquid crystal layer are sandwiched;
a first spacer provided in the image display portion; and
a second spacer provided in the transmissive portion, and
at least one of the pair of substrates includes an insulating substrate and a component provided between the insulating substrate and the first spacer, while not including a component formed by the same material as the above-described component between the insulating substrate and the second spacer.

11. The liquid crystal display device according to claim 5, wherein the liquid crystal display device includes a pair of polarizing plates disposed on the respective front and back surfaces of the liquid crystal display panel, and
at least one of the pair of polarizing plates does not overlap the transmissive portion but overlaps the image display portion.

12. The liquid crystal display device according to claim 11, wherein neither of the pair of polarizing plates overlaps the transmissive portion but both of the pair of polarizing plates overlap the image display portion.

* * * * *